(12) United States Patent
Dupuy et al.

(10) Patent No.: US 9,008,692 B2
(45) Date of Patent: Apr. 14, 2015

(54) METHOD FOR HANDLING POSITION DATA IN A MOBILE EQUIPMENT, AND A MOBILE EQUIPMENT HAVING IMPROVED POSITION DATA HANDLING CAPABILITIES

(75) Inventors: Jean-Christophe Dupuy, Le Cannet (FR); Guilaume Blanc, Peymeinade (FR)

(73) Assignee: Telit Automotive Solutions NV, Leuven (BE)

( * ) Notice: Subject to any disclaimer, the term of this patent is extended or adjusted under 35 U.S.C. 154(b) by 852 days.

(21) Appl. No.: 10/517,538

(22) PCT Filed: Jun. 14, 2002

(86) PCT No.: PCT/IB02/03181
§ 371 (c)(1),
(2), (4) Date: Dec. 10, 2004

(87) PCT Pub. No.: WO03/107708
PCT Pub. Date: Dec. 24, 2003

(65) Prior Publication Data
US 2005/0255866 A1 Nov. 17, 2005

(51) Int. Cl.
| | |
|---|---|
| H04W 24/00 | (2009.01) |
| G01S 5/02 | (2010.01) |
| G01S 19/48 | (2010.01) |
| H04W 4/02 | (2009.01) |
| H04W 4/04 | (2009.01) |
| H04W 4/18 | (2009.01) |
| H04L 29/08 | (2006.01) |
| H04W 52/02 | (2009.01) |

(52) U.S. Cl.
CPC .............. *G01S 5/0263* (2013.01); *G01S 19/48* (2013.01); *H04W 4/02* (2013.01); *H04W 4/043* (2013.01); *H04W 4/18* (2013.01); *H04L 67/04* (2013.01); *H04L 67/18* (2013.01); *H04W 52/0261* (2013.01)

(58) Field of Classification Search
USPC ................. 455/404.2, 414.2, 414.3, 552.1, 455/456.1–456.6
See application file for complete search history.

(56) References Cited

U.S. PATENT DOCUMENTS

| | | | | |
|---|---|---|---|---|
| 6,002,936 | A * | 12/1999 | Roel-Ng et al. | 455/456.4 |
| 6,256,498 | B1 * | 7/2001 | Ludwig | 455/433 |
| RE38,267 | E * | 10/2003 | Borkowski et al. | 455/456.3 |
| 7,076,256 | B1 * | 7/2006 | Orler et al. | 455/456.1 |
| 2002/0019698 | A1 * | 2/2002 | Vilppula et al. | 701/207 |
| 2002/0028683 | A1 | 3/2002 | Banatre et al. | |
| 2003/0013458 | A1 * | 1/2003 | Yabe et al. | 455/456 |

(Continued)

FOREIGN PATENT DOCUMENTS

| | | | |
|---|---|---|---|
| JP | 2000-102058 A | 4/2000 | |
| JP | 2000-308114 A | 11/2000 | |

(Continued)

OTHER PUBLICATIONS

Christ R: Application and Performance of Personnel Tracking Systems; Oct. 2, 1996; pp. 120-128; USA, IEEE.

*Primary Examiner* — Charles Appiah
*Assistant Examiner* — Jaime Holliday
(74) *Attorney, Agent, or Firm* — Pearl Cohen Zedek Latzer Baratz LLP

(57) ABSTRACT

A method and system for handling position determination devices and related position in mobile equipment is described.

21 Claims, 4 Drawing Sheets

(56) References Cited

U.S. PATENT DOCUMENTS

2003/0109265 A1* 6/2003 Yamamoto et al. ............ 455/456
2004/0259566 A1* 12/2004 Maanoja et al. ........... 455/456.1

FOREIGN PATENT DOCUMENTS

| | | |
|---|---|---|
| JP | 2002-081958 A | 3/2002 |
| WO | 02/03093 A1 | 1/2002 |

* cited by examiner

METHOD FOR HANDLING POSITION DATA IN A MOBILE EQUIPMENT, AND A MOBILE EQUIPMENT HAVING IMPROVED POSITION DATA HANDLING CAPABILITIES

CROSS-REFERENCE TO RELATED APPLICATIONS

This application is a National Phase Application of PCT International Application No. PCT/IB02/03181, entitled "A method for handling position data in a mobile equipment, and a mobile equipment having improved position data handling capabilities", International Filing Date Jun. 14, 2002, published on Dec. 24, 2003 as International Publication No. WO/2003/107708, which is incorporated herein by reference in its entirety.

The present invention generally relates to a method and system for handling position determination devices and related position data in a mobile equipment such as a mobile phone, a personal digital assistant, a laptop computer, etc.

BACKGROUND OF THE INVENTION

Modern communication services increasingly tend to use context information, i.e. any information that can be used to characterize the location or position of an entity, where an entity can be a person, place, physical or computational object, and to perform so-called context-aware computing, i.e. to use the context information to provide task-relevant information and/or services to the user of a mobile equipment, wherever they may be.

For instance, network service providing equipments are known where a number of techniques are used for providing services to a user mobile station or equipment based on his current location as determined or obtained at the network level through a predetermined positioning technology.

A major drawback of this known approach is that the network software and/or a software in the mobile equipment needs a specific design for taking into account location information, which design also depends from the type of position data that will be determined or obtained.

Another major drawback is that the predetermined type of position data may not be suitable for all contexts and requested services.

For instance, position data obtained through so-called cell-ID, i.e. the identifiers of the cells of a cellular telephone network within reach of a mobile phone, will not be accurate enough for e.g. indoor navigation service in a shopping mall or other place.

In another example, a GPS device, which has a high power consumption and good accuracy, will not be suitable in contexts where low power consumption is required.

SUMMARY OF THE INVENTION

One object of the present invention is to provide a method and system for handling position information in a mobile equipment that is transparent to any application software designed for a mobile equipment, i.e. that provide a common interface to any position determination technology (hereinafter "PDT") implemented in a mobile equipment, and that allows a user application to self-select and best exploit the capabilities of whatever PDT is available in the mobile equipment.

Another object of the present invention is to allow location-based application developers to interact through a single interface and avoid worrying about complex positioning issues and techniques.

Still another object of the present invention is to provide an adaptable and customizable device and method that can be used by general-purpose wireless applications, and can also be easily tailored for various environments, such as for the automotive environment or for high accuracy in-building navigation applications using local network aided positioning technology.

In particular, the device and method according to the present invention seeks to decrease the efforts and investments needed for integrating location technology into applications developed in standard developing environments such as the so-called J2ME environment (for Java 2 Micro Edition).

More particularly, the present invention provides according to a first aspect a method for generating position information in a mobile equipment provided with at least two position determination devices, the method comprising the following steps:

allocating to each position determination device at least one stored parameter value, determining a context information, depending on the context information, choosing a corresponding position determination device selection process based on the value of said at least one parameter for each position determination device, and selecting a position determination device according to the chosen selection process, and activating said selected position determination device.

Preferred but non-limiting aspects of the above method are the following:

at least two stored parameter values are allocated to each position determination device.

said stored parameter values include at least one among an accuracy value, a response time value and a power consumption value.

the step of selecting a position determination device comprises the sub-steps of:

ranking the position determination devices depending on the chosen selection process, and selecting an available position determination device of best rank.

the method further comprises the steps of:

identifying a position data format as requested by an application, determining whether a currently active position determination device supplies data according to this format, and, in the negative, converting the position data supplied by the currently active position determination device into the requested position data format.

position data include physical position data and logic position data.

physical position data include Cartesian coordinates and longitude/latitude and possibly altitude coordinates.

logic position data include radiofrequency beacon identifiers.

the conversion step comprises reading from a table physical coordinates corresponding to at least one beacon identifier.

According to a second aspect, the present invention provides a mobile equipment having data processing capabilities, comprising:

at least two position determination devices each capable of delivering position information of the mobile equipment in a specific format, at least two drivers for said position determination devices, each driver being capable of storing and retrieving at least one parameter associated with the position determination device, a location handling unit in communication with said drivers and capable of communicating with an application for providing position information, said location handling unit being capable of selecting a position determination device to be used for obtaining position information based on a context information and on the values of said parameters stored in the drivers.

Preferred but non-limiting aspects of the above equipment are the following:

said position determination devices are selected from the group comprising cell-based positioning devices, satellite-based positioning devices and beacon-based positioning devices.

each driver is capable of storing and retrieving at least two different parameters.

said parameters comprise at least two among a position accuracy parameter, a response time parameter and a power consumption parameter.

said location handling unit is adapted to receive a context message from said application and a priority of parameters is established as a function of said context message.

said location handling unit comprises a ranking means capable of storing a set of position determination devices with a preference order according to the parameter(s) of higher priority.

said location handling unit comprises an availability checking means for checking whether a preferred position determination device in said set is available or not and, in the negative, for checking the next preferred position determination device.

said location handling unit is capable of providing to said application position data together with accuracy information relating to said data.

the mobile equipment further comprises a position data conversion unit in communication with said location handling unit.

said location handling unit is responsive to data format requirement information provided by the application for requesting conversion by said position data conversion unit.

the mobile equipment further comprises a position history unit capable of storing a plurality of position data together with time/date information.

BRIEF DESCRIPTION OF THE DRAWING

Other aims, features and advantages of the present invention will better appear from the following detailed description of a preferred embodiment thereof, made with reference to the appended drawings, in which.

DETAILED DESCRIPTION OF A PREFERRED EMBODIMENT

Figure 1:
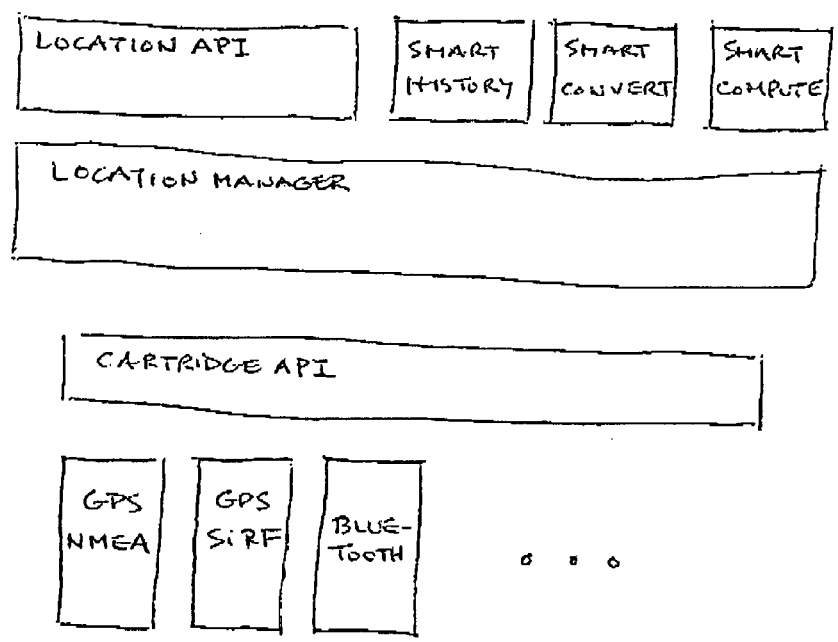
FIG. 1 is a block diagram of the general architecture of a mobile equipment incorporating a location handling system according to the present invention.

It will be first noted that all trademarks cited in the present specification belong to their respective owners.
1) Location Handling System
a) Purposes The basic purpose of the location handling system is both to provide a simple localization interface to application software (at the network and/or mobile side) so that the development of such software does not require that the developers are aware of the positioning technologies the device is equipped with, and to easily enable to best support up-to-date (whether current or future) positioning technologies and/or specific hardware.

On one side the fact of providing a simple interface leads the developers not to have any knowledge about positioning issues and techniques and to interact with all the positioning equipments in the same way. Therefore, the developers of application software which should cooperate with the system do not have to learn at each time how a new or different technology works and will not be required to have specific knowledge on signal propagation, modulation, etc. In other words, the application software using location information does not need to be specifically designed according to existing or future positioning technologies.

Another purpose of the location handling system is to fully exploit the capabilities of a given equipment and to provide an interface common to all the positioning technology, so as to add extra value to those products the Location Handler will support and/or to conform to the Location Handler specifications.

b) Functional Description

A first feature of the location handling system is the support of different positioning technologies, i.e. multiple (at least two) kinds of location devices that can be added or removed dynamically. In this regard, the system includes one driver or "cartridge" per positioning device, with which a main component is capable of communicating individually.

A correlated feature of the location handling system is to make abstraction of the effectively used positioning technology, i.e. to handle different and heterogeneous positioning technologies in a simple and effective way. To that end, the system provides a common, simple but still flexible interface to the application software using location information so as to easily and optimally support new positioning technologies and/or new hardware and/or logic regarding an existing technology.

Another feature of the inventive system is a capability of switching from one positioning technology to another under various circumstances as will be explained in the following. For instance, switching can occur when a currently used positioning technology becomes unavailable or when the currently used positioning technology becomes less adapted to the current circumstances than another positioning technology which is available in the equipment.

In order to implement such dynamic switching, the location handling system cooperates with cartridges associated with the different available positioning technologies, and parameters are stored in a memory in association with each cartridge.

In the present example, four parameters values can be associated with a given cartridge, and the system is capable of reading these parameters values for each cartridge, either at predetermined times or upon specific events, so as to determine through a suitable process which cartridge should be the active one, i.e. which positioning technology should be used.

The four exemplary parameters are ACCURACY, POWER CONSUMPTION, RESPONSE TIME and CUSTOM.

ACCURACY is the default mode, i.e. by default, the system will select the cartridge (i.e. the positioning technology) which provides the best position accuracy.

It should be noted that the values of the ACCURACY, POWER CONSUMPTION and RESPONSE TIME parameters for a given technology are typically obtained from the technical specifications or datasheets provided by positioning technology manufacturers or providers.

The CUSTOM parameter is available for developers, so as to offer the capability to select a positioning technology according to another, existing or future, criterion.

Each cartridge, depending on the associated positioning technology, is capable of handling physical or logic location information.

For instance, technologies such as proximity technologies are not capable of generating physical coordinates such as Cartesian or WGS84, but just consider one or several IDs. More specifically, a mobile equipment having a Bluetooth communication capability can only obtain the addresses BD_ADDR of the beacons which are within reach. Similarly, a communication under the radiofrequency standard 802.11b will give the MAC addresses of the beacons in reach as the position information, and a RF tag system will provide identifiers ("RFid") of the tags with which contact is established.

Other technologies, as will be described in the following, provide as the location information physical information such as Cartesian coordinates (X, Y, Z) or standard latitude/longitude and possibly altitude coordinates, preferably according to the WGS84 standard.

An application software using the system according to the present invention can specify to the system, through a suitable message, the kind of location data it expects.

As an example, these messages are the following:
a "TO_CARTESIAN" message will return Cartesian coordinates;
a "TO_WGS84" message will return standard WGS84 latitude/longitude and possibaltitude coordinates;
a "TO_LOGIC" message will return logic information such as beacon or tag identifiers;
finally, a "TO_ALL" message will return all types of positioning data, whether physical or logic.

In the present embodiment, two positioning technologies are considered, i.e. a GPS system providing WGS84 coordinates and Bluetooth communication system providing addresses of Bluetooth beacons within reach. The one skilled in the art will however easily understand how to adapt the teachings of the present description to other positioning technologies.

When a given positioning device is not capable per se to supply the position information in the format required by the application software, then the present system includes, preferably in the form of a plug-in software module, a conversion module programmed—in a mariner known per se- to convert a given position format to another position format.

For instance, such conversion module is capable of converting Cartesian coordinates into WGS84 coordinates and vice versa. The conversion module can also be in charge of determining physical position data such as Cartesian or WGS84 from logic position data.

The system of the present invention may also include other types of plug-in modules such as:
a history module capable of providing a history service, i.e. position data stored in a memory in association with time/date information; such module may for instance allow the user to set a time window for the position history, and a sampling frequency, i.e. the number of times per minute (or hour, or day, etc.) the position information will be stored together with the associated time/date information;
various computing modules for processing position information; for instance, if the mobile equipment is capable of generating different position data from different positioning technology, a position refinement plug-in module can take as an input these data and compute therefrom a refined position data, taking into account inter alia the accuracy of each positioning technology.

Advantageously, and in a manner known per se by the one skilled in computer art, each plug-in module can be used dynamically: the system automatically detects the presence of a plug-in module and, when needed, calls a given execution in the module by a suitable instruction and parameters.

For instance, in the case the conversion module has been installed and the application software (or the user) asks for physical location data in a given format while the active positioning technology (i.e. the active cartridge) returns a logic position, then the conversion module automatically converts the logic position data into physical location data in said given format.

Similarly, a position refinement plug-in module can be called automatically, when present, so as to allow two or more positioning technologies to be used at the same time and to generate from the data provided by these technologies a refined position data in terms of accuracy.

The system of the present invention can communicate with an application software both asynchronously and synchronously, i.e. can communicate position data to the application either upon request from the application, or at predetermined times.

For that purpose, standard messages can be provided by the application software to the system, basically a position request message to which the system will answer with a message containing the requested position data, and a message requesting the system to automatically output to the application software at a given rate ("polling frequency") provided as a parameter in the message (synchronous mode). Another possibility is that the message contains as a parameter, instead of a polling frequency, a "RealMode" indicator, so that the position handling system will provide refreshed position data as soon as they become available (asynchronous mode).

Practically, the asynchronous mode is advantageously implemented by means of "location listener" which is selectively activated in the system so as to send a position data message to the application software as soon as the position data have been refreshed. The lack of such location listener is automatically detected by the system, which then operates in synchronous mode and/or in "on demand" mode.

In addition, while the system operates in asynchronous mode, an application software preferably can ask for "on demand" localization.

According to another preferred feature, each cartridge receives from the system information about the current mode of operation, so as not to perform useless location determination and to therefore limit power consumption and possibly increase response time.

According to another preferred feature, when the system returns to a requesting application position data, such data are accompanied with a time/date stamp and with an accuracy information indicating the accuracy of the position data.

In a basic mode of operation, the accuracy information is directly read from the ACCURACY parameter field in the cartridge which has determined the position, or derived therefrom.

When a position refining module is present, such module can combine the ACCURACY parameters read from two or more cartridges which have determined the positions used as inputs by the module so as to compute a combined accuracy information.

Other information can also be provided to the application software in addition to the above position, time/date and accuracy data.

Typically, such additional information could include direction, speed, acceleration, etc., as determined by computation based on history data, descriptors related to a specific hardware, etc.

c) Architecture Description

A preferred software architecture for the system and method according to the present invention will now be described with additional details with reference to FIG. 1.

First of all, the core of the architecture is a main location handling component Location Handler which is in charge of handling location and related information. This component queries a plurality of positioning cartridges such as GPS NMEA, GPS SiRF and BlueTooth via a cartridge application programming interface cartridge API, which provides a common interface to all supported positioning technologies. The main component Location Handler can communicate with any application software using position information (not shown in FIG. 1) through a suitable application programming interface Location API.

As above-mentioned, plug-in modules are provided to supply coherent services to the location API. In FIG. 1 have been shown a history module SmartHistory, a conversion module SmartConvert and a computation module SmartCompute.

In view of the types of functionalities offered by the SmartHistory, SmartConvert and SmartCompute plug-in modules, they are each built over Location Handler.

2) Description of Selected Algorithms

A literal description of the essential algorithms implemented in the inventive system and method will now be given.

a) Cartridge Selection

First of all, CartridgeHandler process or algorithm checks whether a currently active cartridge is still available, in the case it is the current cartridge is selected. In case said current cartridge is no longer available, it is closed to release the corresponding resources and the CartridgeHandler process parses a list of current cartridges stored in the system in order to find another cartridge which would be available. As a cartridge is found available it is selected as the current cartridge, per a selection process which will be exemplified in the following. If none of the cartridges referenced by the current cartridges list is available a NoAvailableCartridgeException is raised.

The cartridge selection is a quite simple process as most of the heavy work (list update, etc.) will be done when a new cartridge is added/removed and/or a new criterion or position data format is set (as will be described in the following), and as these types of operations will be rare compared to cartridge selection.

The CartridgeHandler process for cartridge selection purposes is preferably called each time a new location is requested.

b) Cartridge Insertion

When a new cartridge in installed in the system, the CartridgeHandler process checks if the cartridge had been previously installed. In the affirmative, the CartridgeHandler process does nothing. In the negative, the CartridgeHandler process adds the installed cartridge in a table called Vector which collects all the cartridge data, and determines a unique identifier or index thereof (preferably the next available integer N+1 when pre-existing cartridges have indexes comprises between 1 and N). Beside the Vector table are stored four arrays Array of integer values Int. One of the integers array comprises the indexes of the cartridges capable of returning locations in the WGS84 format, another stores the indexes of those returning Cartesian locations, another stores the indexes of those returning logic locations and finally the last stores the indexes of those matching the currently requested position format and preferred criterion. All the arrays array of integer values Int constitute lists of most preferred to least preferred position determination devices according to the priority criterion as will be further described in the following. The CartridgeHandler process checks the type(s) of position data format that the installed cartridge is capable of supplying and writes its index in the corresponding list(s). This insertion process can benefit of the ranking process based on preferred criterion/criteria as will be described in full detail in the following.

c) Cartridge Removal

When a cartridge is to be uninstalled or removed, the CartridgeHandler process checks whether the cartridge was listed in the Vector table. In the negative, it is not, the cartridgeHandler process does nothing. In the affirmative, the CartridgeHandler process verifies the cartridge capabilities and removes it both from the Vector table and the corresponding arrays Array. In the practical embodiment where all installed cartridges have successive indexes which are integers comprised between 1 and N, the removal or a cartridge with an index lower than N also involve a change of the higher indexes, which are decremented by one.

d) Context Dependent Setting

In the case the Location Handler determines that the context has changed (typically this is passed as a context message to the Location Handler component), then it asks the CartridgeHandler process to set a new related strategy regarding parameter-based cartridge selection, so that said process reorders in the arrays Array the cartridges to be activated in priority.

d) Position Data Format Setting

In the case the Location Handler component determines, based on a request or message from application software, that a new position data format should be used which is different from the current format, then it requests the CartridgeHandler process to update the current cartridges indexes list in the arrays Array in order to reflect such change.

e) Cartridge Mode Switching

No assumption can be made about the working mode a cartridge supports. This means that the localization modes (synchronous or asynchronous) have to be handled at higher levels. On the other hand, some positioning devices inherently have the capability to work different ways so as to best behave in a peculiar case.

As the system of the present invention is aimed both to provide a common interface and to best exploit each device, the Location Handler component advantageously includes a capability of switch the mode of operation of the cartridges associated with PDTs which support multiple modes, in compliance with the current status of the Location Handler component.

For instance, an activated cartridge can be set by default to work in synchronous mode. However, when the cartridge receives from the Location Handler component through the CartridgeHandler process a message indicating that the mode has been turned from synchronous to asynchronous mode, then the cartridge conforms its behavior to this mode change and controls the PDT accordingly.

Conversely, as the Location Handler component mode is set back to synchronous, then the CartridgeHandler process restores the synchronous mode of the active cartridge, typically by deactivating same and then reactivating it in the synchronous mode.

j) Cartridge Types

In the present embodiment, the Location Handler component can access to two kinds of cartridges:

pure Java cartridges: these are cartridges based on standard KVM (for "K Virtual Machine", i.e. the standard implementation of the Java 2 Micro Edition environment for a given computing platform); of example would be a cartridge for GPS NMEA positioning technology communicating through serial port;

native cartridges: these are cartridges based on an extended KVM virtual machine (this for instance is the case of a BlueTooth cartridge using a standard or specific BlueTooth application programming interface, such as the standard one included in the standard KVM environment). Hence, such cartridges have the capability of making specific calls to native methods (This could be the case for instance in some cellular phones having an access to an integrated GPS module, such as a cellular phone currently marketed by Benefon).

g) Examples of PDT Constraints Associated to a Context

It has been explained in the foregoing that each cartridge stores a plurality of associated parameters, i.e. ACCURACY, POWER CONSUMPTION, RESPONSE TIME and CUSTOM in the present example.

Besides, the Location Handler component is capable of receiving in a message from an application software, or to determine by itself, a "context" information revealing in what type of context or physical environment the mobile equipment implementing the system is operating.

For instance, when a mobile phone rests on its cradle in a car, then a very simple logic can determine this fact, so that a context parameter value In Car can be set.

Similarly, by analyzing the location history handled by the plug-in module SmartHistory, and in particular the current average speed of the mobile equipment, the Location Handler component can determine whether the used is On Foot or again In Car.

In addition, by polling a cartridge such as a BlueTooth cartridge so as to determine whether BlueTooth beacons are within reach, the Location Handler can determine by itself whether a mobile equipment is Indoor. In the contrary, it is considered as being Outdoor.

In addition, the application software can give to the Location Handler component any other context information as determined or obtained by said software.

The following Table I gives examples of parameter priorities used by the Location Handler component for selecting and activating the most appropriate cartridge in a given context. In this table, the context is defined by the combination of three parameter values, i.e. a user situation information, a location information and a service information. The latter information is typically useful when a given application software can provide different types of services and therefore has different needs concerning the position determination technology to be used.

TABLE I

| User situation | Location | Service | Constraints |
| --- | --- | --- | --- |
| In Car | Outdoor | Navigation | Accuracy Response Time |
| In Car | Outdoor | Traffic Information | Response Time Accuracy |
| On Foot | Indoor/Outdoor | Navigation | Power Consumption Accuracy |
| On Foot | Indoor | Yellow Pages | Accuracy Power Consumption | h) Examples of position determination technologies

The present invention can be advantageously used with the all currently available position determination technologies. Typical examples of these technologies and their properties are given in the following Table II.

TABLE II

| | Properties | | |
| --- | --- | --- | --- |
| Available PDTs | Positioning Accuracy | Response Time | Power Consumption |
| GPS | 50 meters | 1 sec | <170 mW |
| Cell phone antenna ID | 250 meters | 3 sec | <200 mW |
| Bluetooth | 10 meters | 3 sec | <100 mW |

It should be noted that the "Positioning Accuracy" and "Response time" properties are directly used as parameters in the corresponding driving cartridges. The "Power Consumption" parameter can generally be obtained directly or indirectly from the technical data of the manufacturer.

i) Practical Example of Dynamic Positioning Technology Switching

A mobile equipment is in an "in car outdoor navigation" context and needs positioning data to provide the user with real time navigation instructions between his current location and a shopping mall.

The system first determines, among all installed PDTs as listed in table II, those who are available. In the present example, the BlueTooth positioning technology is not available (no BlueTooth beacon in the vicinity). Then, as the priority parameter is determined as being positioning accuracy, the GPS PDT is determined as preferred, and the Cell-ID PDT comes second.

It should be noted here that, should the process determine that two PDTs have the same parameter value as to the criterion of higher priority, then the process selects the PDT to be used as the one having the best parameter as to the criterion coming in second rank (here the "Response Time" criterion/parameter).

Once the user arrived in the shopping mall, either the application software automatically, and/or the user himself manually through a suitable input action, sets the context to "on foot indoor navigation". The available navigation application software has the functionality of providing navigation information to the user e.g. between shopping mall entrance and a selected shop.

The system takes into consideration this new context and tries to find between available PDTs those which (i) currently are available and (ii) better match with this new context.

According to criterion of higher priority attached to the user context, i.e. "Power Consumption", and supposing that the BlueTooth PDT is available and has the best "Power Consumption" parameter, the BlueTooth PDT is therefore selected and activated.

Figure 2:
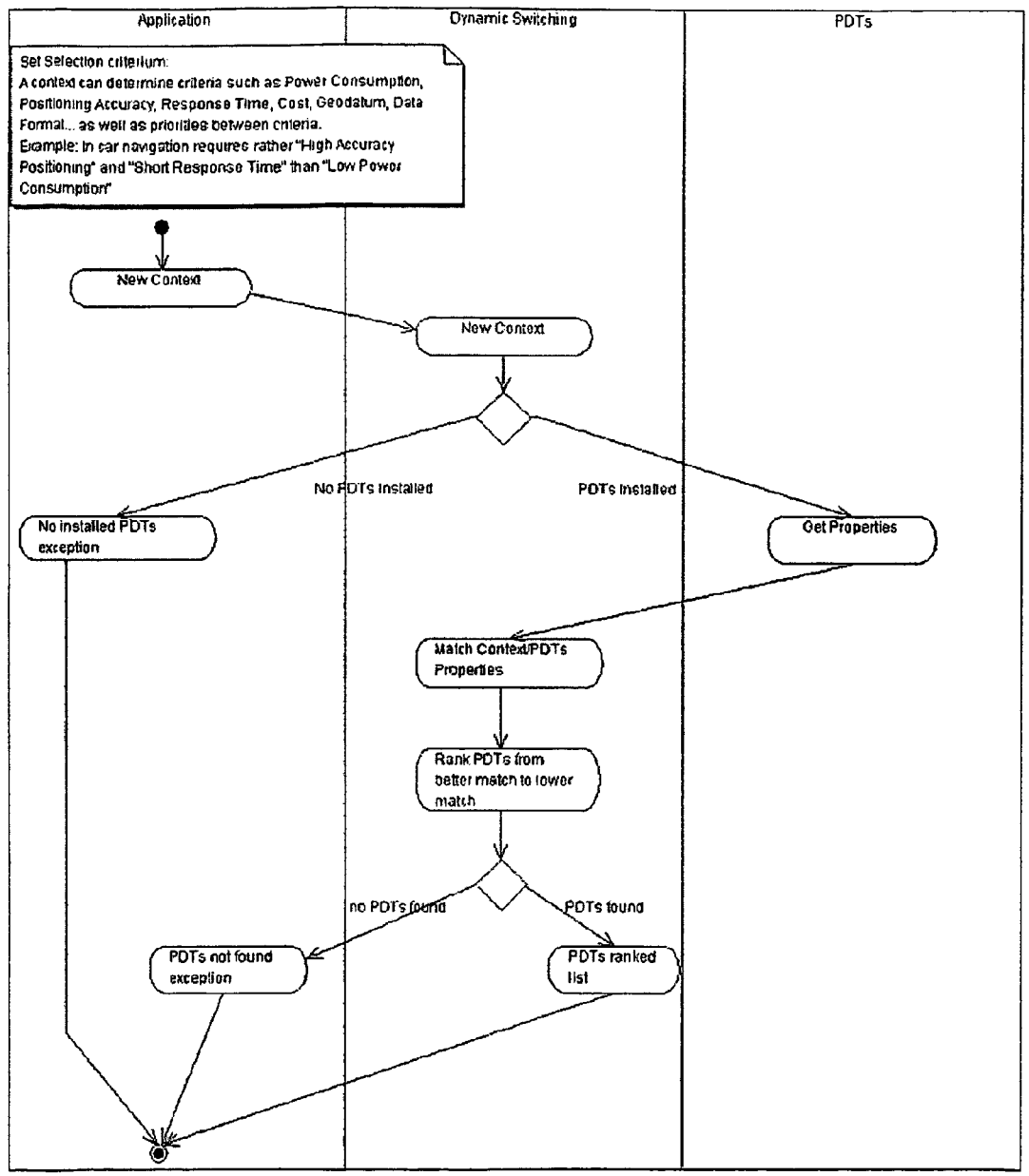
FIGS. 2, 3 and 4 are flow diagrams illustrating three process implemented in the present invention.
Figure 3:
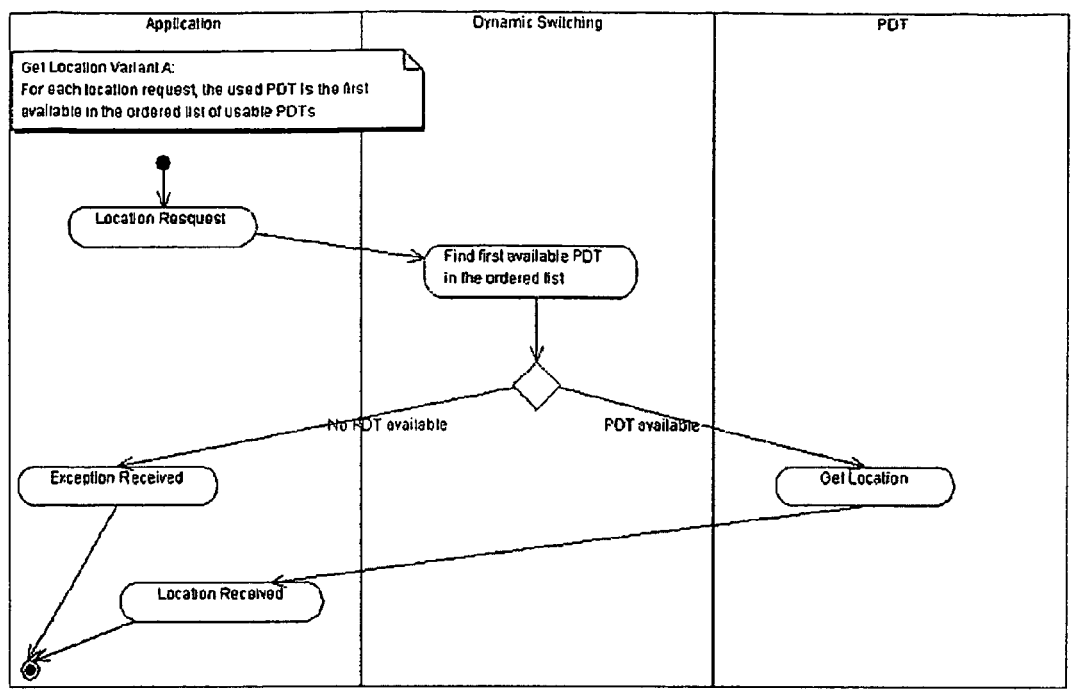
Figure 4:
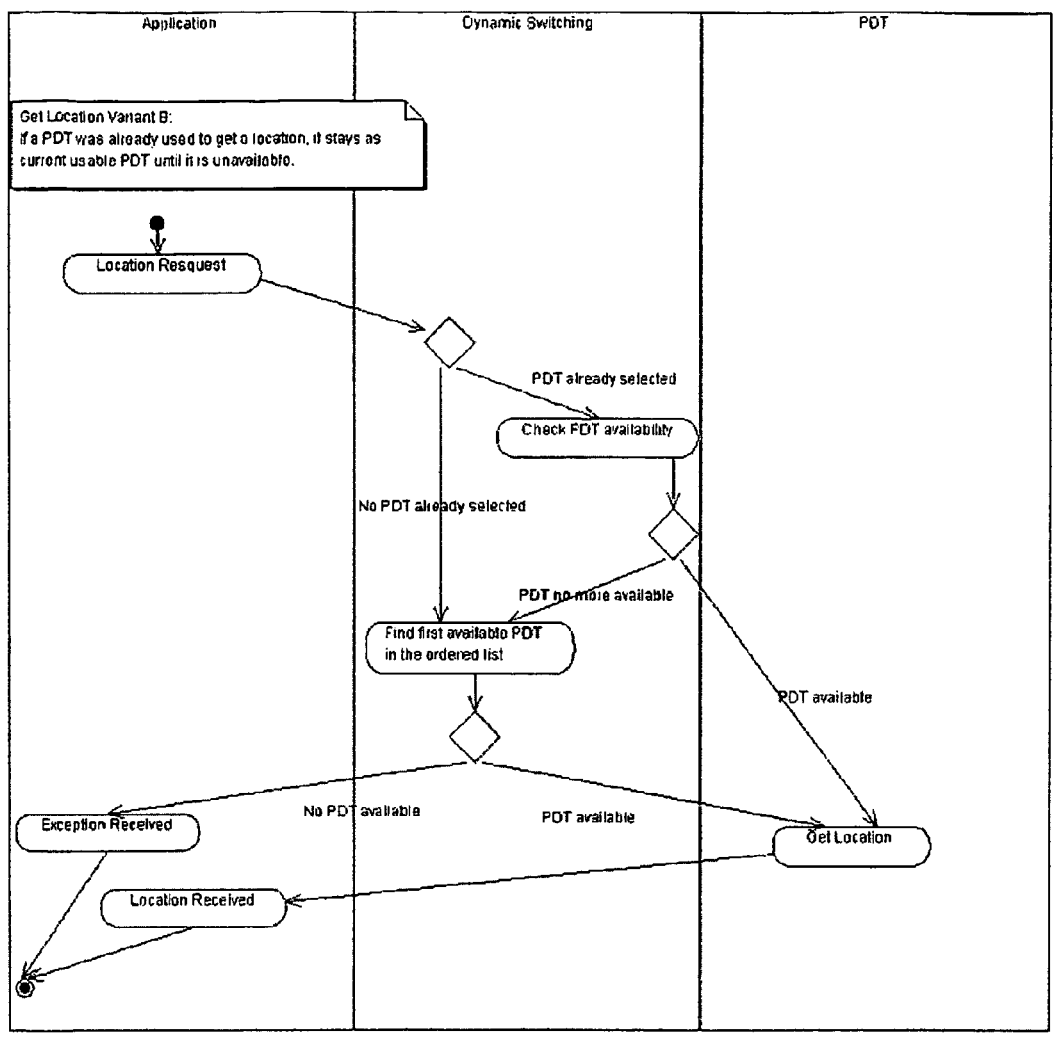

FIGS. 2, 3 and 4 diagrammatically illustrate the essential processes performed according to the present invention. In each of these Figures, the three columns designate from left to right the application software level ("Application"), the location handling level ("Dynamic Switching") and the position determination technology level ("PDTs").

Referring now to FIG. 2, which illustrates the main process when a context changes, a new context is determined at the application software level. A corresponding message, including as a parameter a designation of the new context, is passed to the location handling system. A first test is performed at this level so as to determine whether any PDT is implemented (which requires that the corresponding cartridge is installed). If no PDT is implemented, then the location handling system provides to the application a message indicating this, so the process aborts.

If the location handling system has determined that at least one PDT is present, then a message addressed to the corresponding cartridge(s) allows to obtain the properties (i.e. parameters+data format) thereof.

Then the location handling system, identifies the applicable criteria by order or priority, depending on the context, and applies these criteria to the set of properties, so as to generate a ranking of installed PDTs which could be used in the new context, by order of preference. The arrays Array of integers Int described in the foregoing are used for that purpose.

If the above ranking process finds that no PDT suits the needs defined by the new context, then a corresponding message is provided to the application software, and the process is aborted.

If at least one PDT suiting the needs defined by the new context is found, then an ordered list of PDTs corresponding to the ranking is created and stored (cf Array), from most preferred to least preferred. Then the context change process then ends.

FIG. 3 illustrates the major steps performed when the application software provides to the location handling system a location request message.

The location handling system then parses the ordered list stored in memory as described with reference to FIG. 2, from most preferred to least preferred, and each PDT is checked for availability.

If no PDT appears to be available, a corresponding message is sent to the application software, and the process then ends.

If on the contrary a PDT is determined as being available (the best available), a request for position is provided to the corresponding cartridge, and the position data are then transferred by the location handling system from the cartridge to the application software.

If any data format conversion is to be done, it is performed at this stage under control of the location handling system.

FIG. 4 shows a variant embodiment of the process illustrated in FIG. 3.

While in FIG. 3 the best available PDT was looked for each time location data were requested, the process of FIG. 4 does not perform this check at each time.

More precisely, when a location request message is received by the location handling system (provided of course that the context does not change), the system first determines whether a PDT was already selected or active.

In the negative, a process identical to the one shown in FIG. 3 is performed. In the affirmative, the availability of the currently selected PDT is determined. If this PDT is still available, then the location data are obtained from the PDT cartridge and transferred to the application software. If on the contrary the currently selected PDT is no longer available, then the process of FIG. 3 is performed to find the most preferred available PDT.

Of course, many variants and changed may be brought to the invention as described;

In particular, the present invention can be used with a wide variety of current and future PDTs such as OTD (Observed Time Difference) with a variety of wireless technologies, classical GPS, differential GPS, assisted GPS, Cell-ID (cellular phone network), Enhanced Cell-ID, BlueTooth beacon IDs and similar RF communication systems for intelligent mobile equipment, Bluetooth with distance measurements, etc.

The invention claimed is:

1. A method for generating position information in a mobile equipment provided with at least two position determination devices, the method comprising the following steps:
   sharing access, between multiple applications, to the at least two position determination devices using a common interface,
   allocating to each position determination device at least one stored parameter value,
   detecting insertion of a new position determination device,
   in response to detecting insertion,
      collecting at least one parameter for the new position determination device, and
      adding the new position determination device to a list of position determination devices,
   determining a context information, including whether a user is in transit, on foot or indoors,
   in response to a change in the context information,
      selecting a context-corresponding position determination device selection process from at least two context-corresponding position determination device selection processes,
      using the context corresponding position determination device selection process to order the list of position determination devices based on the value of said at least one parameter for each position determination device,
   in response to one of the multiple applications requesting position information using the common interface,
      selecting a position determination device according to the ordered list of position determination devices, and
      activating said selected position determination device.

2. A method according to claim 1, wherein at least two stored parameter values are allocated to each position determination device.

3. A method according to claim 2, wherein said stored parameter values include at least one among an accuracy value, a response time value and a power consumption value.

4. A method according to claim 1 wherein the step of selecting a position determination device includes the steps of:
   checking for an active position determination device;
   selecting, if an active position determination device is found, the active position determination device independent of the ordered list, and
   selecting, if a no active position determination device is found, a position determination device according to the ordered list of position determination devices.

5. A method according to claim 1, wherein position data include physical position data and logic position data.

6. A method according to claim 5, wherein physical position data include Cartesian coordinates and longitude/latitude coordinates.

7. A method according to claim 5, wherein logic position data include radiofrequency beacon identifiers.

8. A method according to claim 7, wherein the conversion step comprises reading from a table physical coordinates corresponding to at least one beacon identifier.

9. The method of claim 1, further comprising:
identifying a position data format as requested by an application,
determining whether a currently active position determination device supplies data according to this format, and,
in the negative, converting the position data supplied by the currently active position determination device into the requested position data format.

10. The method of claim 1, further including the step of determining whether a user is indoors by detecting the availability of a wireless communication device.

11. A mobile equipment having data processing capabilities, comprising:
at least two position determination devices each capable of delivering position information of the mobile equipment in a specific format,
at least two drivers for said position determination devices, each driver being capable of storing and retrieving at least two different parameters associated with the position determination device,
a location handling unit in communication with said drivers and capable of communicating with an application for providing position information, said location handling unit being capable of selecting a position determination device to be used for obtaining position information based on a context information, including whether a user is in transit, whether the user is on foot and whether the user is indoors, and on the values of said parameters stored in the drivers and said location handling unit is adapted to receive a context message, that includes the context information, from said application and a priority of parameters is established as a function of said context message.

12. A mobile equipment according to claim 11, wherein said position determination devices are selected from the group comprising cell-based positioning devices, satellite based positioning devices and beacon-based positioning devices.

13. A mobile equipment according to claim 11, wherein said parameters comprise at least two among a position accuracy parameter, a response time parameter and a power consumption parameter.

14. A mobile equipment according to claim 11, wherein said location handling unit comprises a ranking means capable of storing a set of position determination devices with a preference order according to the parameter(s) of higher priority.

15. A mobile equipment according to claim 14, wherein said location handling unit comprises an availability checking means for checking whether a preferred position determination device in said set is available or not and, in the negative, for checking the next preferred position determination device.

16. A mobile equipment according to claim 11, wherein said location handling unit is capable of providing to said application position data together with accuracy information relating to said data.

17. A mobile equipment according to claim 11, further comprising a position data conversion unit in communication with said location handling unit.

18. A mobile equipment according to claim 17, wherein said location handling unit is responsive to data format requirement information provided by the application for requesting conversion by said position data conversion unit.

19. A mobile equipment according to claim 18, further comprising a position history unit capable of storing a plurality of position data together with time/date information.

20. The mobile equipment of claim 11, wherein the location handling unit is configured to respond to the activation of a location listener by operating in an asynchronous mode that provides the position information in response to the position information being refreshed, and wherein the location handling unit is configured to respond to the deactivation of the location listener by operating in a synchronous mode that provides the position information in response to an access request.

21. The mobile equipment of claim 20, wherein the location handling unit sends a message to the at least two position determination devices, the message indicating the whether the mode is synchronous and whether the mode is asynchronous.

* * * * *